US012683403B2

(12) United States Patent
Chen et al.

(10) Patent No.: US 12,683,403 B2
(45) Date of Patent: Jul. 14, 2026

(54) METHOD FOR POWER DISTRIBUTION IN ELECTRICITY-HYDROGEN HYBRID ENERGY STORAGE SYSTEM IN MICROGRID, DEVICE, AND MEDIUM

(71) Applicant: Foshan Xianhu Laboratory, Foshan (CN)

(72) Inventors: Jing Chen, Foshan (CN); Chun Xiao, Foshan (CN); Chihua Lu, Foshan (CN); Hao Zheng, Foshan (CN); Yifei Wang, Foshan (CN); Xinbao Wang, Foshan (CN); Linqiang Su, Foshan (CN); Yuliang Hu, Foshan (CN); Bo Yang, Foshan (CN); Binyu Xiong, Foshan (CN); Junbo Fu, Foshan (CN); Xijian Cui, Foshan (CN); Xixiu Wu, Foshan (CN); Yonggang Liu, Foshan (CN); Junjie Zhao, Foshan (CN); Huchuan Yang, Foshan (CN); Zhuo Wang, Foshan (CN); Congding Yang, Foshan (CN); Hang Shu, Foshan (CN); Xiaoteng Ren, Foshan (CN); Kai Hu, Foshan (CN); Yanwen Zhang, Foshan (CN)

(73) Assignee: FOSHAN XIANHU LABORATORY, Foshan (CN)

( * ) Notice: Subject to any disclaimer, the term of this patent is extended or adjusted under 35 U.S.C. 154(b) by 0 days.

(21) Appl. No.: 19/268,597

(22) Filed: Jul. 14, 2025

(65) Prior Publication Data

US 2026/0155654 A1      Jun. 4, 2026

(30) Foreign Application Priority Data

Jul. 30, 2024    (CN) .......................... 202411032641.5

(51) Int. Cl.
*G05B 17/02*          (2006.01)
*H02J 3/32*            (2006.01)
(Continued)

(52) U.S. Cl.
CPC ................ *H02J 3/32* (2013.01); *H02J 3/381* (2013.01); *H02J 7/82* (2026.01); *H02J 7/84* (2026.01);
(Continued)

(58) Field of Classification Search
CPC .......... C01B 3/047; G05B 17/02; H02J 1/106; H02J 1/109; H02J 15/50; H02J 3/28;
(Continued)

(56) References Cited

U.S. PATENT DOCUMENTS

2024/0018304 A1      1/2024   De et al.

FOREIGN PATENT DOCUMENTS

CN          109167391 A      1/2019
CN          113595135 A      11/2021
(Continued)

OTHER PUBLICATIONS

International Search Report and Written Opinions of the International Searching Authority issued for the PCT application No. PCT/CN2024/113364 on Apr. 9, 2025 with English translation.
(Continued)

*Primary Examiner* — Rexford N Barnie
*Assistant Examiner* — Xuan Ly
(74) *Attorney, Agent, or Firm* — Gottlieb, Rackman & Reisman, PC

(57) ABSTRACT

A method for power distribution in an electricity-hydrogen hybrid energy storage system in a microgrid method includes: decomposing a current operating power of a microgrid into a to-be-smoothed power and a grid connection power; distributing the to-be-smoothed power accord-
(Continued)

ing to a current SOC value of the electrochemical energy storage system and a current SOH value of the hydrogen energy storage system with a goal of minimizing operating costs to obtain a first optimal charge/discharge power required for controlling the electrochemical energy storage system to operate and a second optimal charge/discharge power required for controlling the hydrogen energy storage system to operate; and adjusting an SOC state of the electrochemical energy storage system according to a protection strategy determined by the to-be-smoothed power, a preset SOC operating range of the electrochemical energy storage system, and the current SOC value, while controlling an overall operating status of the microgrid.

8 Claims, 3 Drawing Sheets

(51) Int. Cl.

| | | |
|---|---|---|
| *H02J 3/38* | (2026.01) | |
| *H02J 7/82* | (2026.01) | |
| *H02J 7/84* | (2026.01) | |
| *H02J 7/90* | (2026.01) | |
| *H02J 15/50* | (2026.01) | |
| *H02J 101/24* | (2026.01) | |
| *H02J 101/30* | (2026.01) | |
| *H02J 103/35* | (2026.01) | |

(52) U.S. Cl.
CPC .............. *H02J 7/933* (2026.01); *H02J 15/50* (2026.01); *H02J 2101/24* (2026.01); *H02J 2101/30* (2026.01); *H02J 2103/35* (2026.01)

(58) Field of Classification Search
CPC ........ H02J 3/32; H02J 3/36; H02J 3/38; H02J 3/381; H02J 3/46; H02J 2101/24; H02J 2101/30
USPC .......................................................... 307/11
See application file for complete search history.

(56) References Cited

FOREIGN PATENT DOCUMENTS

| CN | 114552659 | * | 5/2022 |
|---|---|---|---|
| CN | 114552659 | A | 5/2022 |
| CN | 115189377 | A | 10/2022 |
| CN | 116131291 | A | 5/2023 |
| CN | 116278987 | A | 6/2023 |
| CN | 116599148 | A | 8/2023 |
| CN | 117220310 | A | 12/2023 |
| CN | 117318102 | A | 12/2023 |
| CN | 118157176 | A | 6/2024 |
| CN | 118199109 | A | 6/2024 |

OTHER PUBLICATIONS

First Office Action for the family patent No. 202411032641.5 on May 12, 2025 with English translation.

* cited by examiner

METHOD FOR POWER DISTRIBUTION IN ELECTRICITY-HYDROGEN HYBRID ENERGY STORAGE SYSTEM IN MICROGRID, DEVICE, AND MEDIUM

CROSS-REFERENCE TO RELATED APPLICATION

This application is based on and claims the benefit of priority from Chinese Patent Application No. 2024110326415, filed on 30 Jul. 2024, the entirety of which is incorporated by reference herein.

TECHNICAL FIELD

The present disclosure relates to the technical field of microgrids, and specifically to a method for power distribution in an electricity-hydrogen hybrid energy storage system in a microgrid, a device, and a medium.

BACKGROUND

In novel power systems mainly based on renewable energy, the use of a variety of energy storage technologies (e.g., electrochemical energy storage technology, hydrogen energy storage technology, etc.) can improve the flexibility and stability of the power grid and solve the problems of intermittency and instability of renewable energy such as wind power, to improve energy utilization efficiency and reduce energy waste.

During the operation of the power system, flexible power distribution needs to be performed for different types of energy storage equipment according to a real-time energy demand. However, conventional power distribution methods for energy storage systems are usually based on a simple rule or a static strategy, e.g., distribution based on fixed proportions or priority-based distribution, and fail to fully consider the real-time operating status of energy storage equipment, e.g., the state of charge (SOC) value of electrochemical energy storage equipment and the state of health (SOH) value of hydrogen energy storage equipment, resulting in inflexible and efficient power distribution, and making it difficult for the power system to reach optimal overall performance.

SUMMARY

The present disclosure provides a method for power distribution in an electricity-hydrogen hybrid energy storage system in a microgrid, a device, and a medium, to at least provide a beneficial choice or create conditions for solving one or more technical problems in conventional technologies.

In accordance with a first aspect of the present disclosure, an embodiment provides a method for power distribution in an electricity-hydrogen hybrid energy storage system in a microgrid, where the electricity-hydrogen hybrid energy storage system includes an electrochemical energy storage system and a hydrogen energy storage system, and the method includes:

acquiring a current operating power of the microgrid, a current state of charge (SOC) value of the electrochemical energy storage system, and a current state of health (SOH) value of the hydrogen energy storage system;

decomposing the current operating power according to a grid connection requirement to obtain a grid connection power and a to-be-smoothed power, in response to an absolute value of the current operating power being greater than a preset power threshold;

distributing the to-be-smoothed power according to the current SOC value and the current SOH value with a goal of minimizing operating costs to obtain a first optimal charge/discharge power of the electrochemical energy storage system and a second optimal charge/discharge power of the hydrogen energy storage system;

determining a protection strategy according to the to-be-smoothed power, a preset SOC operating range of the electrochemical energy storage system, and the current SOC value; and controlling the microgrid to connect to a grid according to the grid connection power, controlling the electrochemical energy storage system to operate according to the first optimal charge/discharge power, controlling the hydrogen energy storage system to operate according to the second optimal charge/discharge power, and adjusting an SOC state of the electrochemical energy storage system according to the protection strategy.

Further, the current operating power of the microgrid is obtained by:

acquiring an electricity-generating power of a photovoltaic system in the microgrid and an electricity-consuming power of a direct current (DC) load in the microgrid, and determining a difference between the electricity-generating power and the electricity-consuming power as the current operating power of the microgrid.

Further, decomposing the current operating power according to a grid connection requirement to obtain a grid connection power and a to-be-smoothed power includes:

processing the current operating power using a variational mode decomposition algorithm, and during the processing, optimizing a mode decomposition number and a penalty factor required by the variational mode decomposition algorithm using a grey wolf optimizer to obtain a plurality of optimal mode components;

dividing the plurality of optimal mode components according to the grid connection requirement to obtain a plurality of low-frequency optimal mode components and a plurality of high-frequency optimal mode components;

combining the plurality of low-frequency optimal mode components to obtain the grid connection power; and combining the plurality of high-frequency optimal mode components to obtain the to-be-smoothed power.

Further, distributing the to-be-smoothed power according to the current SOC value and the current SOH value with a goal of minimizing operating costs to obtain a first optimal charge/discharge power of the electrochemical energy storage system and a second optimal charge/discharge power of the hydrogen energy storage system includes:

determining a fitness function with the goal of minimizing the operating costs;

determining the first charge/discharge power of the electrochemical energy storage system and the second charge/discharge power of the hydrogen energy storage system as target variables to be optimized;

determining a power balance constraint condition according to the target variables and the to-be-smoothed power;

determining an SOC constraint condition according to the target variables and the current SOC value;

determining an SOH constraint condition according to the target variables and the current SOH value; and performing iterative optimization of the target variables using an improved genetic algorithm according to the fitness function, the power balance constraint condition, the SOC constraint condition, and the SOH constraint condition, and introducing an adaptive probability function for crossover and mutation operations in each iteration process, to obtain the first optimal charge/discharge power of the electrochemical energy storage system and the second optimal charge/discharge power of the hydrogen energy storage system.

Further, the power balance constraint condition includes: defining a sum of the first charge/discharge power of the electrochemical energy storage system and the second charge/discharge power of the hydrogen energy storage system as the to-be-smoothed power.

Further, the operating costs are solved by the following expression:

$$C_{use} =$$

$$C_{pc}^{ba} P_{ba\_set}(t) + C_{vc}^{ba} \int_0^{T_s} P_{ba\_set}(t) dt + C_{pc}^{he} P_{he\_set}(t) + C_{vc}^{he} \int_0^{T_s} P_{he\_set}(t) dt$$

where $C_{use}$ is the operating costs, $$C_{pc}^{ba}$$

is a unit power cost of the electrochemical energy storage system, $$C_{pc}^{he}$$

is a unit capacity cost of the electrochemical energy storage system, $$C_{vc}^{ba}$$

is a unit power cost of the hydrogen energy storage system, $$C_{vc}^{he}$$

is a unit capacity cost of the hydrogen energy storage system, $T_s$ is a sampling period, $P_{ba\_set}(t)$ is the first charge/discharge power of the electrochemical energy storage system, and $P_{he\_set}(t)$ is the second charge/discharge power of the hydrogen energy storage system.

Further, the preset SOC operating range of the electrochemical energy storage system includes a high SOC range, a normal SOC range, and a low SOC range, and determining a protection strategy according to the to-be-smoothed power, a preset SOC operating range of the electrochemical energy storage system, and the current SOC value includes:

in response to the to-be-smoothed power being greater than zero and the current SOC value falling within the high SOC range, determining the protection strategy as: controlling the electrochemical energy storage system to discharge until an SOC value of the electrochemical energy storage system drops to the normal SOC range, electric energy generated by the electrochemical energy storage system being supplied to the hydrogen energy storage system; and in response to the to-be-smoothed power being less than zero and the current SOC value falling within the low SOC range, determining the protection strategy as: controlling the electrochemical energy storage system to be charged until an SOC value of the electrochemical energy storage system rises to the normal SOC range, electric energy required by the electrochemical energy storage system being supplied by the hydrogen energy storage system.

Further, the method further includes: maintaining an operating status of the microgrid unchanged, in response to the absolute value of the current operating power being less than or equal to the preset power threshold.

In accordance with a second aspect of the present disclosure, an embodiment provides an electronic device, including a memory and a processor, where the memory is configured for storing a computer program, and the processor is configured for executing the computer program to implement the method for power distribution in an electricity-hydrogen hybrid energy storage system in a microgrid in accordance with the first aspect.

In accordance with a third aspect of the present disclosure, an embodiment provides a computer-readable storage medium, having a computer program stored thereon, where the computer program, when executed by a processor, causes the processor to implement the method for power distribution in an electricity-hydrogen hybrid energy storage system in a microgrid in accordance with the first aspect.

The present disclosure has the following beneficial effects. The current operating power of microgrid is properly decomposed by using the variational mode decomposition algorithm optimized by the grey wolf optimizer, such that the missing of important frequency characteristic information can be avoided. The to-be-smoothed power of the electricity-hydrogen hybrid energy storage system is flexibly and efficiently distributed by fully considering the SOC value of the electrochemical energy storage system and the SOH value of the hydrogen energy storage system, and in this process, an improved genetic algorithm is introduced and minimizing operating costs is used as an optimization goal to improve the precision of power distribution, so as to meet energy requirements of the microgrid in different scenarios to the greatest extent and enabling the microgrid to reach optimal overall performance. During the adjustment of the overall operating status of the microgrid, the protection strategy is enabled, to ensure that the real-time SOC value of the electrochemical energy storage system falls within the normal SOC range all the time, so as to maintain the service life and operational stability of the lithium-ion battery as much as possible, and avoid the frequent startup of the PEM electrolyzer and the hydrogen fuel cell in the hydrogen energy storage system.

BRIEF DESCRIPTION OF DRAWINGS

The drawings are provided for a further understanding of the technical schemes of the present disclosure, and constitute a part of the description. The drawings and the embodiments of the present disclosure are used to explain the technical schemes of the present disclosure, but are not intended to limit the technical schemes of the present disclosure.

DETAILED DESCRIPTION

Figure 1:
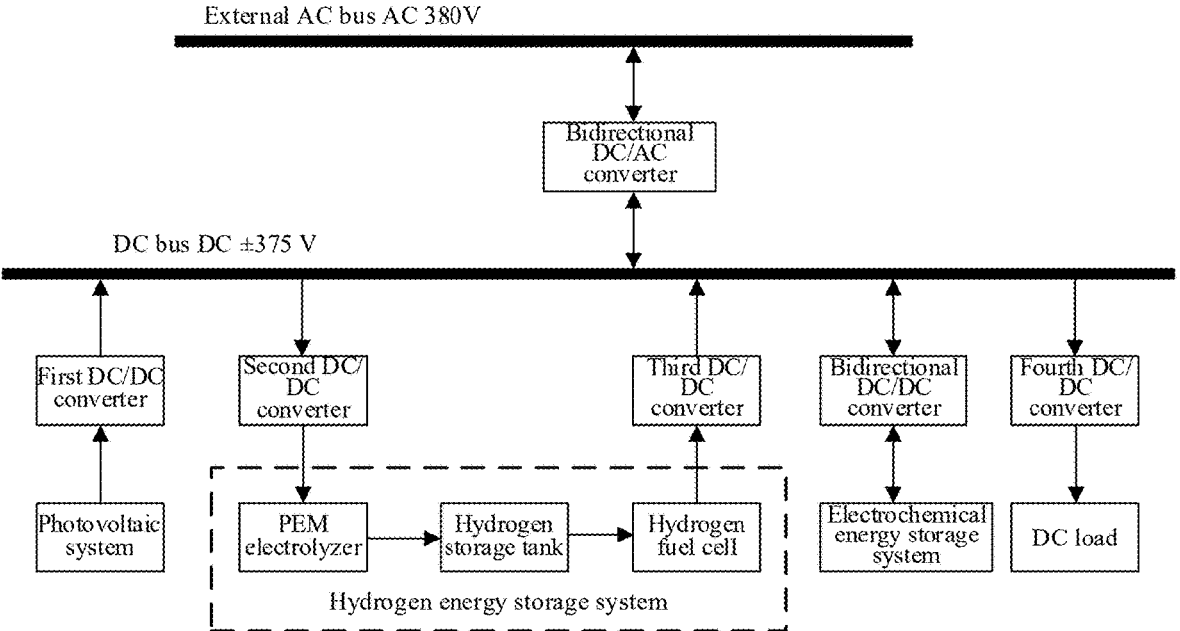
FIG. 1 is a schematic structural diagram of a microgrid according to an embodiment of the present disclosure.

To make the objectives, technical schemes, and advantages of the present disclosure clearer, the present disclosure is described in further detail in conjunction with accompanying drawings and embodiments. It is to be understood that the specific embodiments described herein are merely used for illustrating the present disclosure, and are not intended to limit the present disclosure.

It is to be noted that although a logical order is shown in the flowcharts, in some cases, the steps shown or described may be performed in an order different from that in the flowcharts. In the specification, claims, or accompanying drawings, the terms "first," "second" or the like are intended to distinguish between similar objects but do not indicate a particular order or sequence. It is to be understood that the data termed in such a way are interchangeable in appropriate circumstances, such that the embodiments of the present disclosure described herein can be implemented in orders other than the order illustrated or described herein.

Unless otherwise defined, meanings of all technical and scientific terms used in this specification are the same as those usually understood by those having ordinary skills in the art to which the present disclosure belongs. Terms used in this specification are merely intended to describe objectives of the embodiments of the present disclosure, but are not intended to limit the present disclosure.

In addition, the described features, structures or characteristics may be combined in one or more embodiments in any appropriate manner. In the following descriptions, a lot of specific details are provided to give a comprehensive understanding of the embodiments of the present disclosure. However, those having ordinary skills in the art is to be aware that, the technical schemes in the present disclosure may be implemented without one or more of the particular details, or another method, unit, apparatus, or step may be used. In other cases, well-known methods, apparatuses, implementations, or operations are not shown or described in detail, to avoid obscuring the aspects of the present disclosure.

The flowcharts shown in the drawings are illustrative only, and neither indicate that all the contents and operations/steps must be included, nor indicate that the operations/steps must be executed in the order described. For example, some operations/steps may be further divided, while some operations/steps may be combined or partially combined. Therefore, an actual execution order may change according to an actual case.

First, some terms involved in the present disclosure are explained.

Variational mode decomposition (VMD) is an adaptive signal decomposition method that can decompose time series data into multiple intrinsic mode functions (IMFs) with a specific center frequency and a specific bandwidth. Each IMF can be regarded as an oscillation mode of the original signal, and the IMFs constitute a complete representation of the original signal.

Grey wolf optimizer (GWO) is an optimization algorithm inspired by the behavior of grey wolves in nature, which mainly simulates the social hierarchy and hunting strategy of grey wolf population. The grey wolf population is classified into four types of wolves: wolf leader (Alpha), wolf deputy (Beta), wolf consultant (Delta), and working wolf (Omega). This hierarchical structure helps the grey wolf population organize hunting and allocate resources in an efficient way. In the algorithm, the wolf leader represents an optimal solution, the wolf deputy represents a suboptimal solution, the wolf consultant represents the third best solution, and the working wolf follows the guidance of these leaders to explore the search space. The running process of the entire algorithm is mainly to gradually approach the optimal solution by tracking, surrounding, and attacking prey with reference to the cooperative hunting mode of grey wolves.

Genetic algorithm (GA) is an optimization algorithm that finds an optimal solution by simulating biological evolution. It mainly relies on the mechanisms of genetics, mutation, and natural selection to perform efficient iterative search for problem solving. The basic idea of the entire algorithm is to express the solution of the problem as multiple different individuals, then evaluate the adaptability of each individual according to a definition of a fitness function, determine the probability of each individual in reproduction, and after operations such as crossover and mutation, use the new individual to replace the original individual and continue to compete with other generated individuals. This process is iterated until the optimal solution is found or a maximum number of iterations is reached.

FIG. 1 is a schematic structural diagram of a microgrid according to an embodiment of the present disclosure. The microgrid includes: an energy router; a direct current (DC) bus; and a photovoltaic system, an electricity-hydrogen hybrid energy storage system, and a DC load, which are connected to the DC bus by the energy router. The electricity-hydrogen hybrid energy storage system includes a hydrogen energy storage system and an electrochemical energy storage system. The hydrogen energy storage system includes a proton exchange membrane (PEM) electrolyzer, a hydrogen storage tank, and a hydrogen fuel cell. A lithium-ion battery is generally used in the electrochemical energy storage system.

Basically, the energy router includes a first DC/DC converter, a second DC/DC converter, a third DC/DC converter, a fourth DC/DC converter, a bidirectional DC/DC converter, and a bidirectional DC/AC converter. The photovoltaic system is connected to the DC bus through the first DC/DC converter. The PEM electrolyzer is connected to the DC bus through the second DC/DC converter. The PEM electrolyzer is connected to the hydrogen storage tank. The hydrogen storage tank is connected to the hydrogen fuel cell. The hydrogen fuel cell is connected to the DC bus through the third DC/DC converter. The DC load is connected to the DC bus through the fourth DC/DC converter. The electrochemical energy storage system is connected to the DC bus through the bidirectional DC/DC converter. The DC bus is connected to an external AC bus through the bidirectional DC/AC converter. The energy router can realize electrical isolation, voltage conversion, and bidirectional flow of electric energy, provides "plug-and-play" standardized interfaces for different levels and forms of sources and loads, and can adjust the voltage and current of each converter in real time.

In practical applications, the photovoltaic system captures solar energy and uses the photovoltaic effect to convert the solar energy to electric energy. The electric energy is converted through the first DC/DC converter and then directly connected to the DC bus, to supply electricity to the PEM electrolyzer or the DC load or to be stored by the electrochemical energy storage system. The electric energy supplied by the DC bus is subjected to voltage level conversion through the second DC/DC converter and then supplies electricity to the PEM electrolyzer for consumption, and hydrogen gas produced during the operation of the PEM electrolyzer is stored in the hydrogen storage tank. The hydrogen fuel cell can convert hydrogen gas stored in the hydrogen storage tank into electric energy, which is subjected to voltage level conversion through the third DC/DC converter and then connected to the DC bus for compensation. The electric energy supplied by the DC bus is subjected to voltage level conversion through the bidirectional DC/DC converter and is then inputted to the electrochemical energy storage system for storage. The electric energy stored in the electrochemical energy storage system is subjected to voltage level conversion through the bidirectional DC/DC converter and is then connected to the DC bus for compensation. The electric energy supplied by the DC bus is subjected to voltage level conversion through the fourth DC/DC converter and then supplies electricity to the DC load for consumption. The bidirectional DC/AC converter may be understood as a grid connection port, which is configured for realizing AC-to-DC conversion, DC-to-AC conversion, and bidirectional electricity flow between the DC bus and the external AC bus. It is be noted that the microgrid may be deployed in an industrial park, a residential community, an island-type electricity consumption station, a backup station, or other places.

Figure 2:
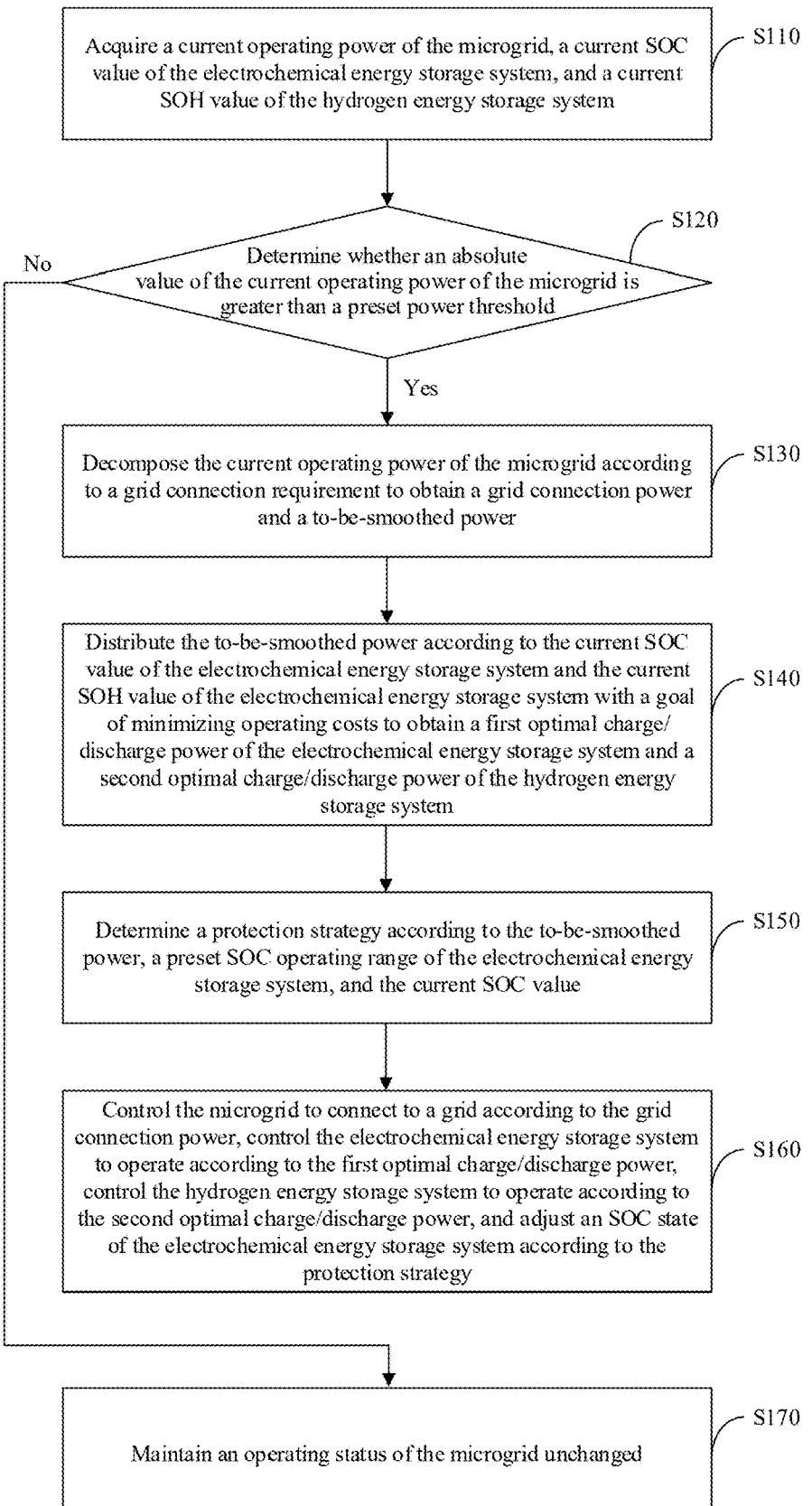
FIG. 2 is a schematic flowchart of a method for power distribution in an electricity-hydrogen hybrid energy storage system in a microgrid according to an embodiment of the present disclosure.

Based on this, FIG. 2 is a schematic flowchart of a method for power distribution in an electricity-hydrogen hybrid energy storage system in a microgrid according to an embodiment of the present disclosure. The method includes the following steps.

In a step of S110, a current operating power of the microgrid, a current SOC value of the electrochemical energy storage system, and a current SOH value of the hydrogen energy storage system are acquired.

In a step of S120, it is determined whether an absolute value of the current operating power of the microgrid is greater than a preset power threshold. If yes, S130 is executed. If no, S170 is executed.

In a step of S130, the current operating power of the microgrid is decomposed according to a grid connection requirement to obtain a grid connection power and a to-be-smoothed power.

In a step of S140, the to-be-smoothed power is distributed according to the current SOC value of the electrochemical energy storage system and the current SOH value of the electrochemical energy storage system with a goal of minimizing operating costs to obtain a first optimal charge/discharge power of the electrochemical energy storage system and a second optimal charge/discharge power of the hydrogen energy storage system.

In a step of S150, a protection strategy is determined according to the to-be-smoothed power, a preset SOC operating range of the electrochemical energy storage system, and the current SOC value.

In a step of S160, the microgrid is controlled to connect to a grid according to the grid connection power, the electrochemical energy storage system is controlled to operate according to the first optimal charge/discharge power, the hydrogen energy storage system is controlled to operate according to the second optimal charge/discharge power, and an SOC state of the electrochemical energy storage system is adjusted according to the protection strategy.

In a step of S170, an operating status of the microgrid is maintained unchanged.

In some embodiments, a method of acquiring the current operating power of the microgrid in the above step S110 is: acquiring an electricity-generating power of the photovoltaic system and an electricity-consuming power of the DC load, and subtracting the electricity-consuming power of the DC load from the electricity-generating power of the photovoltaic system to obtain the current operating power of the microgrid.

After the current operating power of the microgrid is determined, the current operating power of the microgrid is compared with the preset power threshold to determine whether the microgrid needs to be connected to a grid and whether the current operating status of the electricity-hydrogen hybrid energy storage system needs to be adjusted, to further ensure the overall operational stability of the microgrid.

In some embodiments, an implementation process of the above step S130 includes, but not limited to, the following steps.

In a step of S131, the current operating power of the microgrid is processed using a variational mode decomposition algorithm, and during the processing, a penalty factor and a mode decomposition number used in the variational mode decomposition algorithm are optimized using a grey wolf optimizer to finally generate a plurality of optimal mode components, where each optimal mode component represents different frequency component information in the current operating power of the microgrid.

In a step of S132, the plurality of optimal mode components are divided according to the grid connection requirement to obtain a plurality of high-frequency optimal mode components and a plurality of low-frequency optimal mode components, where the grid connection requirement includes a specification made on a frequency range of signals allowed to be received by an external main grid in consideration of grid connection stability.

In a step of S133, the plurality of low-frequency optimal mode components are combined to obtain the grid connection power.

In a step of S134, the plurality of high-frequency optimal mode components are combined to obtain the to-be-smoothed power.

In the above step S131, the grey wolf optimizer is introduced for parameter optimization to obtain an optimal penalty factor and an optimal mode decomposition number, such that the bandwidth and center frequency of each mode component obtained through decomposition can be better controlled, and the intrinsic characteristics of the current operating power of the microgrid can be more accurately obtained.

To be specific, for the processing of the current operating power of the microgrid using the variational mode decomposition algorithm in the above step S131, a corresponding implementation process includes, but not limited to, the following steps A1 to A6.

In a step of A1, basic parameters used in the variational mode decomposition algorithm, including a sampling window width, a sampling window type, a sampling frequency, the penalty factor, and the mode decomposition number, are set.

In a step of A2, Hilbert transformation is performed on the current operating power of the microgrid to obtain a single-sided spectrum of each mode function:

$$A = \left[\delta(t) + \frac{j}{\pi t}\right] * p_k(t)$$

where $p_k(t)$ is the mode function, A is the single-sided spectrum, $\delta(t)$ is a Dirac function, j is a sign of an imaginary number, t is time, and * is a sign of a convolution operation.

In a step of A3, an estimated center frequency of an analytic signal corresponding to each mode function is adjusted, and a spectrum of each mode function is modulated to a corresponding base band:

$$B = \left\{\left[\delta(t) + \frac{j}{\pi t}\right] * p_k(t)\right\} e^{-j\omega_k t}$$

where B is the base band, $\omega_k$ is the center frequency, and e is an exponential function.

In a step of A4, to ensure that the sum of the estimated bandwidths of all the mode functions is minimum, the sum of all the mode functions should be constrained to be equal to the current operating power of the microgrid, i.e., a constrained variational problem is determined as:

$$\begin{cases} \min\limits_{\{p_k\}\{\omega_k\}} \sum\limits_{k=1}^{K} \left\| \partial_t \left\{\left(\delta(t) + \frac{j}{\pi t}\right) * p_k(t)\right\} e^{-j\omega_k t} \right\|_2^2 \\ \text{s.t.} \sum\limits_{k=1}^{K} p_k = f \end{cases}$$

where $\{p_k\} = \{p_1, p_2, \ldots, p_K\}$, and $\{\omega_k\} = \{\omega_1, \omega_2, \ldots, \omega_K\}$; and where K is the mode decomposition number, i.e., the number of all the mode functions, $\partial_t$ is a gradient of a demodulated signal, f is the current operating power of the microgrid, and $$\|\cdot\|_2^2$$

is a sign of norm.

In a step of A5, a Lagrange multiplier is introduced and used in combination with the penalty factor to transform the constrained variational problem into an unconstrained variational problem, which may be expressed using an augmented Lagrangian expression:

$$L(\{p_k\}, \{\omega_k\}, \lambda) = \gamma \sum_k \left\| \partial_t \left\{\left(\delta(t) + \frac{j}{\pi t}\right) * p_k(t)\right\} e^{-j\omega_k t} \right\|_2^2 + \left\| f(t) - \sum_k p_k(t) \right\|_2^2 + \left\langle \lambda(t), f(t) - \sum_k p_k(t) \right\rangle$$

where L is an augmented Lagrange function, $\lambda$ is the Lagrange multiplier, $\gamma$ is the penalty factor, and $\langle \cdot \rangle$ is a vector inner product.

In a step of A6, the unconstrained variational problem is solved using an alternate direction method of multipliers (ADMM) algorithm, extrema in the augmented Lagrangian expression are determined by alternately updating $$p_k^{n+1}, \omega_k^{n+1}, \text{ and } \lambda^{n+1},$$

and the current operating power of the microgrid is decomposed into several optimal mode components.

It is to be noted that in the above step A6, Parseval/Plancherel Fourier isometry is used to transform the unconstrained variational problem into a frequency domain $\omega$, and then updated values of $$p_k^{n+1} \text{ and } \omega_k^{n+1}$$

in the frequency domain $\omega$ after the simplification are determined based on the following formulas by using the principle of hermitian symmetry:

$$\hat{p}_k^{n+1}(\omega) = \frac{\hat{f}(\omega) - \sum\limits_{i \neq k} \hat{p}_i(\omega) + \frac{\hat{\lambda}(\omega)}{2}}{1 + 2\gamma(\omega - \omega_k)^2}$$

$$\omega_k^{n+1} = \frac{\int_0^\infty \omega |\hat{p}_k(\omega)|^2 d\omega}{\int_0^\infty |\hat{p}_k(\omega)|^2 d\omega}$$

where $$\hat{p}_k^{n+1}(\omega)$$

is a Wiener filter of the current residual component, and $$\omega_k^{n+1}$$

is the center frequency of $\hat{p}_k(\omega)$.

To be specific, for the optimization of the penalty factor and the mode decomposition number used in the variational mode decomposition algorithm using the grey wolf optimizer in the above step S131, a corresponding implementation process includes, but not limited to, the following steps B1 to B6.

In a step of B1, basic parameters required by the grey wolf optimizer, including a population size and a maximum number of iterations, are set, the penalty factor and the mode decomposition number are determined as target variables to be optimized by the grey wolf optimizer, and a fitness function to be used in the iterative optimization process is determined, where the fitness function is preferably set to be an average correlation coefficient between all mode components and the current operating power of the microgrid.

In a step of B2, a grey wolf population is randomly initialized, such that initial positions of different grey wolf individuals represent different initial target variable values.

In a step of B3, variational mode decomposition is performed on the current operating power of the microgrid according to the initial position of each grey wolf, an initial fitness value corresponding to each grey wolf is calculated, the initial positions of three grey wolves with the largest initial fitness values are acquired and saved, and the three grey wolves are respectively defined as an optimal wolf leader, an optimal wolf deputy, and an optimal wolf consultant.

In a step of B4, during the $t^{th}$ iteration, a position update is performed on the current grey wolf population using the following mathematical expression:

$$\vec{X}_{GW}(t+1) = \vec{X}_P(t) - \vec{A} \bullet \left| \vec{C} \bullet \vec{X}_P(t) - \vec{X}_{GW}(t) \right|$$

$$\vec{A} = 2\vec{a} \bullet \vec{r}_1 - \vec{a}, \vec{C} = 2 \bullet \vec{r}_2, \vec{a} = 2 - \frac{2t}{t_{max}}$$

where $\vec{X}_{GW}(t+1)$ is the position of the grey wolf individual after the $(t+1)^{th}$ iteration, $\vec{X}_{GW}(t)$ is the position of the grey wolf individual after the $t^{th}$ iteration, $\vec{X}_P(t)$ is the position of a prey after the $t^{th}$ iteration, $\vec{A}$ and $\vec{C}$ are coefficient vectors, $\vec{a}$ is a reference parameter, $\vec{r}_1$ and $\vec{r}_2$ are random numbers in an interval [0,1], and $t_{max}$ is the maximum number of iterations.

In a step of B5, variational mode decomposition is performed on the current operating power of the microgrid according to the current position of each grey wolf, a current fitness value corresponding to each grey wolf is calculated, to determine a new optimal wolf leader, a new optimal wolf deputy, and a new optimal wolf consultant, and current positions of and current fitness values corresponding to the new optimal wolf leader, the new optimal wolf deputy, and the new optimal wolf consultant are saved.

In a step of B6, it is determined whether the maximum number of iterations is reached. If yes, the current position of the new optimal wolf leader is outputted as an optimal target variable value, where the optimal target variable value includes an optimal penalty factor and an optimal mode decomposition number. If not, let t=t+1, and execute the step B4 again.

It is to be noted that the above step B4 is executed starting from t=1.

In some embodiments, an implementation process of S140 includes, but not limited to, the following steps.

In a step of S141, minimizing operating costs is used as an optimization goal, and a fitness function is defined:

$$C_{use} =$$

$$C_{pc}^{ba}P_{ba\_set}(t) + C_{vc}^{ba}\int_0^{T_s} P_{ba\_set}(t)dt + C_{pc}^{he}P_{he\_set}(t) + C_{vc}^{he}\int_0^{T_s} P_{he\_set}(t)dt$$

$$f(t) = \frac{1}{C_{use}}$$

where $C_{use}$ is the operating costs, $$C_{pc}^{ba}$$

is a unit power cost of the electrochemical energy storage system, $$C_{pc}^{he}$$

is a unit power cost of the hydrogen energy storage system, $$C_{vc}^{ba}$$

is a unit capacity cost of the electrochemical energy storage system, $$C_{vc}^{he}$$

is a unit capacity cost of the hydrogen energy storage system, $T_s$ is a sampling period, $P_{ba\_set}(t)$ is the first charge/discharge power of the electrochemical energy storage system, $P_{he\_set}(t)$ is the second charge/discharge power of the hydrogen energy storage system, and f(t) is the fitness function.

In a step of S142, the first charge/discharge power of the electrochemical energy storage system and the second charge/discharge power of the hydrogen energy storage system are determined as target variables to be optimized by an improved genetic algorithm.

In a step of S143, based on the target variables and the to-be-smoothed power, a power balance constraint condition is defined as follows:

$$P_{hess}(t) = P_{ba\_set}(t) + P_{he\_set}(t) = P_{ba\_set}^{ch}(t) - P_{ba\_set}^{dis}(t) + P_{he\_set}^{fc}(t) - P_{he\_set}^{el}(t)$$

$$\begin{cases} P_{ba\_min}^{ch} \le P_{ba\_set}^{ch}(t) \le P_{ba\_max}^{ch} \\ P_{ba\_min}^{dis} \le P_{ba\_set}^{dis}(t) \le P_{ba\_max}^{dis} \end{cases}$$

$$\begin{cases} P_{he\_min}^{fc} \le P_{he\_set}^{fc}(t) \le P_{he\_set}^{fc} \\ P_{he\_min}^{el} \le P_{he\_set}^{el}(t) \le P_{he\_max}^{el} \end{cases}$$

where $P_{hess}(t)$ is the to-be-smoothed power, $P_{ba\_set}(t)$ is the first charge/discharge power of the electrochemical energy storage system, $P_{he\_set}(t)$ is the second charge/discharge power of the hydrogen energy storage system, $$P_{ba\_set}^{ch}(t)$$

is a charging power of the lithium-ion battery, $$P_{ba\_set}^{dis}(t)$$

is a discharging power of the lithium-ion battery, $$P_{he\_set}^{ch}(t)$$

is an electricity-generating power of the hydrogen fuel cell, $$P_{he\_set}^{el}(t)$$

is an electricity-consuming of the PEM electrolyzer, $$P_{ba\_min}^{ch}$$

is a minimum charging power of the lithium-ion battery, $$P_{ba\_max}^{ch}$$

is a maximum charging power of the lithium-ion battery, $$P_{ba\_min}^{dis}$$

is a minimum discharging power of the lithium-ion battery, $$P_{ba\_max}^{dis}$$

is a maximum discharging power of the lithium-ion battery, $$P_{he\_min}^{fc}$$

is a minimum electricity-generating power of the hydrogen fuel cell, $$P_{he\_max}^{fc}$$

is a maximum electricity-generating power of the hydrogen fuel cell, $$P_{he\_min}^{el}$$

is a minimum electricity-consuming power of the PEM electrolyzer, and $$P_{he\_max}^{el}$$

is a maximum electricity-consuming power of the PEM electrolyzer.

In a step of S144, based on the target variables and the current SOC value of the electrochemical energy storage system, an SOC constraint condition is defined as follows:

$$\begin{cases} SOC_{min} \leq SOC(t) \leq SOC_{max} \\ SOC(t) = SOC(t-1) + \dfrac{\displaystyle\int_0^{T_s} P_{ba\_set}(t)dt}{E_{ba\_r}} \end{cases}$$

where SOC(t) is an SOC value of the electrochemical energy storage system after operating according to the first charge/discharge power, [SOC_{min}, SOC_{max}] is the preset SOC operating range of the electrochemical energy storage system, $SOC_{min}$ is the minimum SOC value of the electrochemical energy storage system, $SOC_{max}$ is the maximum SOC value of the electrochemical energy storage system, SOC(t−1) is the current SOC value of the electrochemical energy storage system, and $E_{ba\_r}$ is a rated capacity of the lithium-ion battery.

In a step of S145, based on the target variables and the current SOH value of the hydrogen energy storage system, an SOH constraint condition is defined as follows:

$$\begin{cases} SOH_{min} \leq SOH(t) \leq SOH_{max} \\ SOH(t) = SOH(t-1) + \left( \dfrac{v_{H_2}^{in} - v_{H_2}^{out}}{m_{H_2\_rated}} \right) \cdot T_s \\ v_{H_2}^{in} = \dfrac{V_{H_2} I_{el}}{2F}, V_{H_2} = \dfrac{R(273+T)}{p}, I_{el} = \dfrac{P_{he\_set}^{el}(t)}{U_{ideal\_el}} \\ v_{H_2}^{out} = \dfrac{P_{he\_set}^{fc}(t)}{2FU_{fc}} \end{cases}$$

where SOH(t) is an SOH value of the hydrogen energy storage system after operating according to the second charge/discharge power, [SOH_{min},SOH_{max}] is a preset SOH operating range of the hydrogen energy storage system, $SOH_{min}$ is the minimum SOH value of the hydrogen energy storage system, $SOH_{max}$ is the maximum SOH value of the hydrogen energy storage system, SOH(t−1) is the current SOH value of the hydrogen energy storage system, $$v_{H_2}^{in}$$

is a gas intake capacity of the hydrogen storage tank, $$v_{H_2}^{out}$$

is a gas output capacity of the hydrogen storage tank, $m_{H_2\_rated}$ is the maximum hydrogen storage capacity of the hydrogen storage tank, $V_{H_2}$ is a hydrogen volume under an ideal gas equation, $I_{el}$ is an operating current of the PEM electrolyzer, F is the Faraday constant, R is the ideal gas constant, T is an operating temperature of the PEM electrolyzer, P is an operating pressure of the PEM electrolyzer, $U_{ideal\_el}$ is an ideal operating voltage of the PEM electrolyzer, and $U_{fc}$ is an operating voltage of the hydrogen fuel cell.

In a step of S146, iterative optimization of the target variables is performed using the improved genetic algorithm according to the power balance constraint condition, the SOC constraint condition, the SOH constraint condition, and the fitness function, and an adaptive probability function is introduced for crossover and mutation operations in each iterative optimization process, to obtain the first optimal charge/discharge power of the electrochemical energy storage system and the second optimal charge/discharge power of the hydrogen energy storage system.

In the above step S146, the introduction of the adaptive probability function for crossover and mutation can prevent the algorithm from falling into a local optimal solution, and allows for more granular searches to improve the quality of the solution.

To be specific, for the iterative optimization of the target variables performed using the improved genetic algorithm in the above step S146, a corresponding implementation process includes, but not limited to, the following steps.

In a step of S146.1, basic parameters required by the improved genetic algorithm, including a population size and a maximum number of iterations, are set, and the first charge/discharge power of the electrochemical energy storage system and the second charge/discharge power of the hydrogen energy storage system are determined as target variables to be optimized by the improved genetic algorithm.

In a step of S146.2, a population is randomly initialized, such that initial positions of different individuals represent different initial target variable values and the power balance constraint condition, the SOC constraint condition, and the SOH constraint condition are satisfied.

In a step of S146.3, during the t iteration, a fitness value corresponding to each individual is calculated according to the position of the individual, the fitness values are sorted, and individuals with the largest fitness values accounting for 10% of the population size are selected as elite individuals and are restricted from participating in crossover and mutation, and the remaining individuals accounting for 90% of the population size are determined as non-elite individuals.

In a step of S146.4, the following adaptive probability function is introduced for crossover and mutation of the non-elite individuals to obtain new individuals:

$$P_e = \begin{cases} \left(P_e^{max} - P_e^{min}\right) \cdot \ln\left\{\dfrac{e-1}{e \cdot \left[\overline{f}(t) - f_{max}(t)\right]} \cdot f(t) + \dfrac{\overline{f}(t) - e \cdot f_{max}(t)}{e \cdot \left[\overline{f}(t) - f_{max}(t)\right]}\right\} + \\ \qquad P_e^{max}, \; f(t) \geq \overline{f}(t) \\ P_e^{max}, \; f(t) < \overline{f}(t) \end{cases}$$

$$P_m = \begin{cases} \left(P_m^{max} - P_m^{min}\right) \cdot \ln\left\{\dfrac{e-1}{e \cdot \left[\overline{f}(t) - f_{max}(t)\right]} \cdot f(t) + \dfrac{\overline{f}(t) - e \cdot f_{max}(t)}{e \cdot \left[\overline{f}(t) - f_{max}(t)\right]}\right\} + \\ \qquad P_m^{max}, \; f(t) \geq \overline{f}(t) \\ P_m^{max}, \; f(t) < \overline{f}(t) \end{cases}$$

where $P_c$ is a crossover probability, $$P_c^{max}$$

is an upper limit of the crossover probability, $$P_c^{min}$$

is a lower limit of the crossover probability, $P_m$ is the mutation probability, $$P_m^{max}$$

is an upper limit of the mutation probability, $$P_m^{min}$$

is a lower limit of the mutation probability, e is a natural constant, which is about 2.718, f(t) is a fitness value corresponding to the individual after the $t^{th}$ iteration, $\overline{f}$(t) is an average fitness value corresponding to the population after the $t^{th}$ iteration, and $f_{max}$(t) is a maximum fitness value corresponding to the population after the $t^{th}$ iteration.

In a step of S146.5, the elite individuals and the new individuals are combined to form a new-generation population, and then all individuals satisfying the power balance constraint condition, the SOC constraint condition, and the SOH constraint condition are selected from the new-generation population to form a feasible optimal new-generation population.

In a step of S146.6, it is determined whether the maximum number of iterations is reached. If yes, an individual with the largest fitness value is selected from the current optimal new-generation population, and the current position of the individual is outputted as an optimal target variable value, where the optimal target variable value includes the first optimal charge/discharge power of the electrochemical energy storage system and the second optimal charge/discharge power of the hydrogen energy storage system. If not, let t=t+1, and execute the step S146.3 again.

It is to be noted that the above step S146.3 is executed starting from t=1.

In some embodiments, the present disclosure proposes to preferentially further divide the preset SOC operating range [$SOC_{min}$,$SOC_{max}$] of the electrochemical energy storage system into three non-intersecting ranges, namely, a low SOC range [$SOC_{min}$,$SOC_{he-fc}$), a normal SOC range [$SOC_{he-fc}$,$SOC_{he-el}$], and a high SOC range $SOC_{he-el}$, $SOC_{max}$], where $SOC_{he-el}$ is the maximum critical SOC value and $SOC_{he-fc}$ is the minimum critical SOC value, and then a protection strategy that needs to be enabled in the process of adjusting the overall operating status of the microgrid is formulated according to the to-be-smoothed power and the current SOC value of the electrochemical energy storage system, i.e., the implementation process of the above step S150 is as follows.

(1) When it is identified that the to-be-smoothed power is greater than zero and the current SOC value of the electrochemical energy storage system falls within the high SOC range ($SOC_{he-el}$,$SOC_{max}$], it is determined that the electrochemical energy storage system is currently in a charging state and the PEM electrolyzer is currently in an operating state. In this case, the corresponding protection strategy is formulated as: controlling the electrochemical energy storage system to perform a discharge operation until the SOC value of the electrochemical energy storage system drops to the normal SOC range [$SOC_{he-fc}$,$SOC_{he-el}$], which may be construed as that the discharging can be stopped when the SOC value of the electrochemical energy storage system drops to $SOC_{he-el}$. Moreover, electric energy generated by the operation of the electrochemical energy storage system is supplied to the hydrogen energy storage system in real time to maintain the operation of the PEM electrolyzer.

(2) When it is identified that the to-be-smoothed power is less than zero and the current SOC value of the electrochemical energy storage system falls within the low SOC range [$SOC_{min}$,$SOC_{he-fc}$), it is determined that the electrochemical energy storage system is currently in a discharging state and the hydrogen fuel cell is currently in an operating state. In this case, the corresponding protection strategy is formulated as: controlling the electrochemical energy storage system to perform a charging operation until the SOC value of the electrochemical energy storage system rises to the normal SOC range [$SOC_{he-fc}$,$SOC_{he-el}$], which may be construed as that the charging can be stopped when the SOC value of the electrochemical energy storage system rises to $SOC_{he\text{-}fc}$. Moreover, in the case that the operation of the hydrogen fuel cell is maintained, electric energy required for the operation of the electrochemical energy storage system is supplied by the hydrogen energy storage system in real time.

In the embodiments of the present disclosure, the current operating power of the microgrid is properly decomposed by using the variational mode decomposition algorithm optimized by the grey wolf optimizer, such that the missing of important frequency characteristic information can be avoided. The to-be-smoothed power of the electricity-hydrogen hybrid energy storage system is flexibly and efficiently distributed by fully considering the SOC value of the electrochemical energy storage system and the SOH value of the hydrogen energy storage system, and in this process, an improved genetic algorithm is introduced and minimizing operating costs is used as an optimization goal to improve the precision of power distribution, so as to meet energy requirements of the microgrid in different scenarios to the greatest extent and enabling the microgrid to reach optimal overall performance. During the adjustment of the overall operating status of the microgrid, the protection strategy is enabled, to ensure that the real-time SOC value of the electrochemical energy storage system falls within the normal SOC range all the time, so as to maintain the service life and operational stability of the lithium-ion battery as much as possible, and avoid the frequent startup of the PEM electrolyzer and the hydrogen fuel cell in the hydrogen energy storage system.

In addition, an embodiment of the present disclosure further provides a computer-readable storage medium, having a computer program stored thereon. The computer program, when executed by a processor, causes the processor to implement the method for power distribution in an electricity-hydrogen hybrid energy storage system in a microgrid in accordance with the above embodiments. The computer-readable storage medium includes, but not limited to, any type of disk (e.g., floppy disk, hard disk, optical disk, compact disc read-only memory (CD-ROM), magneto-optical disk, etc.), a read-only memory (ROM), a random access memory (RAM), an erasable programmable read-only memory (EPROM), an electrically erasable programmable read-only memory (EEPROM), a flash memory, a magnetic card, or an optical card. In other words, the computer-readable storage medium includes any medium on which information is stored or transmitted in a readable form by a device (e.g., a computer, a mobile phone, etc.), and may be a read-only memory, a magnetic disk, or an optical disk, etc.

Figure 3:
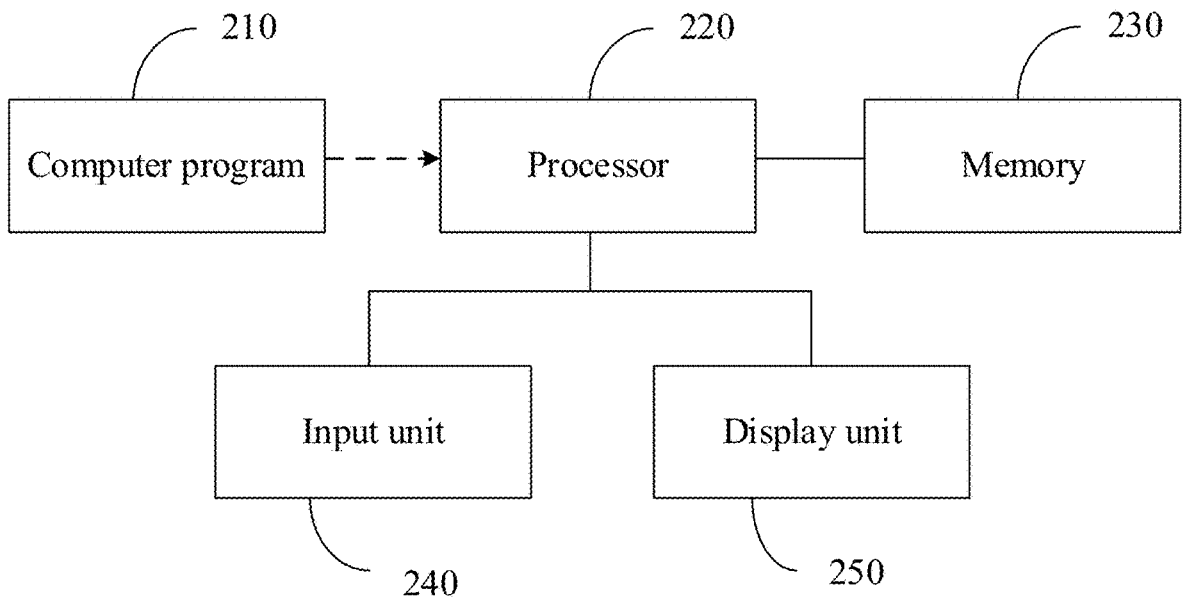
FIG. 3 is a schematic structural diagram of hardware of a computer device according to an embodiment of the present disclosure.

FIG. 3 is a schematic structural diagram of hardware of a computer device according to an embodiment of the present disclosure. The computer device includes a processor 220, a memory 230, an input unit 240, a display unit 250, and other components. It can be understood by those having ordinary skills in the art that the structure of the computer device shown in FIG. 3 does not constitute a limitation on the computer device, and the computer device may include more components or fewer components than those shown in the figure, or some components may be combined. The memory 230 may be configured for storing a computer program 210 and various functional modules. The processor 220 runs the computer program 210 stored in the memory 230 to execute various functional applications and data processing of the computer device. The memory may be an internal memory or an external memory, or may include an internal memory and an external memory. The internal memory may include a read-only memory (ROM), a programmable ROM (PROM), an electrically programmable ROM (EPROM), an electrically erasable programmable ROM (EEPROM), a flash memory, or a random access memory. The external memory may include a hard disk, a floppy disk, a USB flash drive, a magnetic tape, etc. The memory 230 disclosed in the embodiments of the present disclosure includes, but is not be limited to, these types of memories described above. The memory 230 disclosed in the embodiments of the present disclosure is merely an example and is not limiting.

The input unit 240 is configured for receiving an inputted signal and receiving a keyword inputted by a user. The input unit 240 may include a touch panel and other input devices. The touch panel may collect a touch operation performed by a user on or near the touch panel (such as an operation performed by a user on or near the touch panel using any suitable object or attachment, such as a finger or a stylus), and drive a corresponding connection apparatus according to a preset program. The other input devices may include, but not limited to, one or more of a physical keyboard, a functional key (such as a play control key or a switch key), a track ball, a mouse, and a joystick. The display unit 250 may be configured for displaying information inputted by the user or information provided for the user, and various menus of a terminal device. The display unit 250 may be implemented using a liquid crystal display, an organic light-emitting diode, etc. The processor 220 is a control center of the terminal device, and is connected to various parts of the terminal device through various interfaces and lines. By running or executing a software program and/or module stored in the memory 230 and invoking data stored in the memory 230, the processor 220 performs various functions and processes data.

In an embodiment, the computer device includes a processor 220, a memory 230, and a computer program 210, where the computer program 210 is stored in the memory 230 and is configured for being executed by the processor 220, and the computer program 210 is configured for executing the method for power distribution in an electricity-hydrogen hybrid energy storage system in a microgrid in accordance with the above embodiments.

Those having ordinary skills in the art can understand that all or some of the steps in the methods disclosed above and the functional modules/units in the system and the apparatus can be implemented as software, firmware, hardware, and appropriate combinations thereof.

In the specification and accompanying drawings of the present disclosure, the terms "include," "comprise," and any other variants thereof mean are intended to cover a non-exclusive inclusion. For example, a process, method, system, product, or device that includes a list of steps or units is not necessarily limited to those expressly listed steps or units, but may include other steps or units not expressly listed or inherent to such a process, method, product, or device.

It is to be understood that in the present disclosure, "at least one" means one or more and "a plurality of" means two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relationship between the associated objects. "At least one of" and similar expressions refer to any combination of items listed, including one item or any combination of a plurality of items. For example, at least one of a, b, or c may represent a, b, c, "a and b," "a and c," "b and c," or "a, b, and c", where a, b, and c may be singular or plural.

Although the present disclosure has been described in considerable detail and particularly with respect to the above embodiments, the present disclosure is not intended to be limited to any of these details or embodiments or any particular embodiment, but should be considered to be effectively covered by the intended scope of the present disclosure by referring to the appended claims and taking into account the prior art to provide a broad possible interpretation of these claims. In addition, the above description of the present disclosure based on the contemplated embodiments is for the purpose of providing a useful description, and those insubstantial modifications to the present disclosure that are not currently foreseen may still represent equivalent modifications to the present disclosure.

What is claimed is:

1. A method for power distribution in an electricity-hydrogen hybrid energy storage system in a microgrid, wherein the electricity-hydrogen hybrid energy storage system comprises an electrochemical energy storage system and a hydrogen energy storage system, and the method comprises:

acquiring a current operating power of the microgrid, a current state of charge (SOC) value of the electrochemical energy storage system, and a current state of health (SOH) value of the hydrogen energy storage system;

decomposing the current operating power according to a grid connection requirement to obtain a grid connection power and a to-be-smoothed power, in response to an absolute value of the current operating power being greater than a preset power threshold;

distributing the to-be-smoothed power according to the current SOC value and the current SOH value with a goal of minimizing operating costs to obtain a first optimal charge/discharge power of the electrochemical energy storage system and a second optimal charge/discharge power of the hydrogen energy storage system; wherein the operating costs are solved by the following expression:

$$C_{use} = C_{pc}^{ba} P_{ba\_set}(t) + C_{vc}^{ba} \int_0^{T_s} P_{ba\_set}(t)dt + C_{pc}^{he} P_{he\_set}(t) +$$

$$C_{vc}^{he} \int_0^{T_s} P_{he\_set}(t)dt$$

wherein $C_{use}$ is the operating costs, $$C_{pc}^{ba}$$

is a unit power cost of the electrochemical energy storage system, $$C_{vc}^{ba}$$

is a unit capacity cost of the electrochemical energy storage system, $$C_{pc}^{he}$$

is a unit power cost of the hydrogen energy storage system, $$C_{vc}^{he}$$

is a unit capacity cost of the hydrogen energy storage system, $T_s$ is a sampling period, $P_{ba\_set}(t)$ is the first charge/discharge power of the electrochemical energy storage system, and $P_{he\_set}(t)$ is the second charge/discharge power of the hydrogen energy storage system;

determining a protection strategy according to the to-be-smoothed power, a preset SOC operating range of the electrochemical energy storage system, and the current SOC value;

controlling the microgrid to connect to a grid according to the grid connection power, controlling the electrochemical energy storage system to operate according to the first optimal charge/discharge power, controlling the hydrogen energy storage system to operate according to the second optimal charge/discharge power, and adjusting an SOC state of the electrochemical energy storage system according to the protection strategy;

wherein the preset SOC operating range of the electrochemical energy storage system comprises a high SOC range, a normal SOC range, and a low SOC range, and determining a protection strategy according to the to-be-smoothed power, a preset SOC operating range of the electrochemical energy storage system, and the current SOC value comprises:

in response to the to-be-smoothed power being greater than zero and the current SOC value falling within the high SOC range, determining the protection strategy as: controlling the electrochemical energy storage system to discharge until an SOC value of the electrochemical energy storage system drops to the normal SOC range, electric energy generated by the electrochemical energy storage system being supplied to the hydrogen energy storage system; and in response to the to-be-smoothed power being less than zero and the current SOC value falling within the low SOC range, determining the protection strategy as: controlling the electrochemical energy storage system to be charged until an SOC value of the electrochemical energy storage system rises to the normal SOC range, electric energy required by the electrochemical energy storage system being supplied by the hydrogen energy storage system.

2. The method for power distribution in an electricity-hydrogen hybrid energy storage system in a microgrid of claim 1, wherein the current operating power of the microgrid is obtained by:

acquiring an electricity-generating power of a photovoltaic system in the microgrid and an electricity-consuming power of a direct current (DC) load in the microgrid, and determining a difference between the electricity-generating power and the electricity-consuming power as the current operating power of the microgrid.

3. The method for power distribution in an electricity-hydrogen hybrid energy storage system in a microgrid of claim 1, wherein decomposing the current operating power according to a grid connection requirement to obtain a grid connection power and a to-be-smoothed power comprises:

processing the current operating power using a variational mode decomposition algorithm, and during the processing, optimizing a mode decomposition number and a penalty factor required by the variational mode decomposition algorithm using a grey wolf optimizer to obtain a plurality of optimal mode components;

dividing the plurality of optimal mode components according to the grid connection requirement to obtain a plurality of low-frequency optimal mode components and a plurality of high-frequency optimal mode components;

combining the plurality of low-frequency optimal mode components to obtain the grid connection power; and combining the plurality of high-frequency optimal mode components to obtain the to-be-smoothed power.

4. The method for power distribution in an electricity-hydrogen hybrid energy storage system in a microgrid of claim 1, wherein distributing the to-be-smoothed power according to the current SOC value and the current SOH value with a goal of minimizing operating costs to obtain a first optimal charge/discharge power of the electrochemical energy storage system and a second optimal charge/discharge power of the hydrogen energy storage system comprises:

determining a fitness function with the goal of minimizing the operating costs;

determining the first charge/discharge power of the electrochemical energy storage system and the second charge/discharge power of the hydrogen energy storage system as target variables to be optimized;

determining a power balance constraint condition according to the target variables and the to-be-smoothed power;

determining an SOC constraint condition according to the target variables and the current SOC value;

determining an SOH constraint condition according to the target variables and the current SOH value; and performing iterative optimization of the target variables using an improved genetic algorithm according to the fitness function, the power balance constraint condition, the SOC constraint condition, and the SOH constraint condition, and introducing an adaptive probability function for crossover and mutation operations in each iteration process, to obtain the first optimal charge/discharge power of the electrochemical energy storage system and the second optimal charge/discharge power of the hydrogen energy storage system.

5. The method for power distribution in an electricity-hydrogen hybrid energy storage system in a microgrid of claim 4, wherein the power balance constraint condition comprises: defining a sum of the first charge/discharge power of the electrochemical energy storage system and the second charge/discharge power of the hydrogen energy storage system as the to-be-smoothed power.

6. The method for power distribution in an electricity-hydrogen hybrid energy storage system in a microgrid of claim 1, further comprising: maintaining an operating status of the microgrid unchanged, in response to the absolute value of the current operating power being less than or equal to the preset power threshold.

7. A computer device, comprising a memory and a processor, wherein the memory is configured for storing a computer program, and the processor is configured for executing the computer program to perform the method for power distribution in an electricity-hydrogen hybrid energy storage system in a microgrid of claim 1.

8. A computer-readable storage medium, having a computer program stored thereon, wherein the computer program, when executed by a processor, causes the processor to perform the method for power distribution in an electricity-hydrogen hybrid energy storage system in a microgrid of claim 1.

* * * * *